United States Patent Office 3,788,801
Patented Jan. 29, 1974

3,788,801
PROCESS FOR THE PREPARATION OF FAST DYEINGS AND PRINTS ON FIBROUS MATERIAL CONTAINING HYDROXYL GROUPS OR NITROGEN
Ernst Hille, Ruppertshain, Taunus, Ernst Hoyer and Fritz Meininger, Frankfurt am Main, and Johannes Rottmann, Niedernhausen, Taunus, Germany, assignors to Farbwerke Hoechst Aktiengesellschaft vormals Meister Lucius & Bruning, Frankfurt am Main, Germany
No Drawing. Filed Sept. 1, 1972, Ser. No. 285,670
Claims priority, application Germany, Sept. 1, 1971, P 21 43 750.3
Int. Cl. D06p 1/38
U.S. Cl. 8—1 P                                    9 Claims

ABSTRACT OF THE DISCLOSURE

A process for the preparation of fast dyeings and prints on fibrous materials containing hydroxy groups or nitrogen, which process comprises applying water-soluble organic dyestuffs which contain at least a group of the formula

—$SO_2$—$CH_2$—$CH_2$—O—CO—NH—X in the molecule in which group X is a hydrogen atom or an —$SO_3H$— group on the said fibrous materials and fixing them at normal or at elevated temperature or under the action of heat yielding very valuable, intense dyeings and prints which are very stable when being subjected to treatments of washing and to the action of light. They have also a remarkable fastness to water, seawater, rubbing, ironing, acids, alkalis and solvents. When being finished afterwards with synthetic resins in an acid medium, dyeings and prints of the invention show advantageous properties.

---

The present invention relates to a process for the preparation of fast dyeings and prints on fibrous material containing hydroxyl groups or nitrogen.

It has been found that fast deyings and prints can be obtained on fibrous material containing hydroxyl groups or nitrogen by applying on this fibrous material water-soluble organic dyestuffs which contain at least one group of the Formula 1

—$SO_2$—$CH_2$—$CH_2$—O—CO—NH—X     (1)

in the molecule in which group X is a hydrogen atom or an —$SO_3H$ group and by fixing the dyestuffs at normal or at an elevated temperature or under the action of heat, optionally using acid-binding agents. To make the dyestuffs to be used sufficiently water-soluble, they contain at least one or more water-solubilizing groups, for example, carboxylic acid groups or, above all, sulfonic acid groups.

Suitable fibrous materials containing hydroxyl groups or nitrogen are, for example, natural or synthetic fibers containing nitrogen, such as wool, silk, synthetic polyamide or polyurethane fibers, or fibers containing hydroxyl groups, such as native cellulose fibers in the form of hemp, linen, jute, but, above all, cotton and regenerated cellulose fibers.

Dyestuff precursors having the subsequently mentioned Formulae 5 and 6, which are required for synthesis of the dyestuffs of the invention, can be obtained, for example, by reacting a compound of Formula 2

R—$SO_2$—$CH_2$—$CH_2$—OH in which R is the radical of a dyestuff precursor with chlorosulfonyl isocyanate of the Formula 3

O=C=N—$SO_2Cl$ and saponifying the compound of Formula 4 so obtained with alkalis to the compounds of Formula 5 or with acids to the compounds of Formula 6

R—$SO_2$—$CH_2$—$CH_2$—OH + O=C=N—$SO_2Cl$ —→
(2)                              (3)

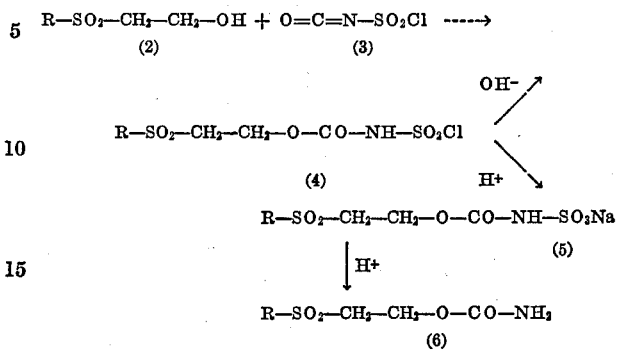

The dyestuff precursors of the Formulae 5 or 6 so obtained are then used for synthesis of the dyestuffs of the invention according to the usual, known methods to yield organic dyestuffs.

The above-mentioned reaction may, however, also be effected with the dyestuff containing a β-hydroxyethylsulfonyl group, in which case it is often advantageous to use instead of the chlorosulfonyl isocyanate the pyridine addition reaction product thereof.

Suitable water-soluble organic dyestuffs which contain at least one group of the above Formula 1 in the molecule are, for example, monoazo, dis-, tris-, tetrakis- or polyazo dyestuffs and the heavy metal complex compounds thereof, anthraquinone dyestuffs, phthalocyanine dyestuffs, formazane dyestuffs and the heavy metal complex compounds thereof, dyestuffs of the series of the dioxazines, the brilliant sulfoflavines, the rhodamines or the nitro dyestuffs.

The dyestuffs so obtained for the dyeing and printing of the fibrous materials mentioned above are applied according to the application methods generally used for reactive dyestuffs. Dyeing on cellulose fibers are obtained by impregnating the material to be dyed with the dyestuff solutions or by dyeing in a long liquor according to the direct dyeing method. If there is no or no marked affinity towards the fiber it is advantageous to impregnate the material with aqueous solutions, which may contain salt, at cold or moderately elevated temperature and to squeeze it subsequently.

Acid-binding agents to be used are, preferably, inorganic compounds, for example, alkali metal or alkaline earth metal hydroxides, alkali metal bicarbonates, alkali metal carbonates, alkali metal phosphates, such as trisodium phosphate, or mixtures of disodium phosphate and trisodium phosphate, alkali metal borates, alkali metal silicates, alkali metal salts of trichloroacetic acid or mixtures of these acid-binding agents.

Further substances may be added to the aqueous dyestuff solutions used for the preparation of the dyeings, above all, electrolytes, for example sodium chloride or sodium sulfate, urea, dispersing agents, surfactive agents and thickening agents, for example, sodium alginate.

The dyestuffs applied to the fibrous material are fixed after impregnation by treating the impregnated material with heat, if necessary, after previous intermediate drying. When the fibrous material containing cellulose is impregnated, for example, in the presence of an alkali hydroxide, the dyestuffs may be fixed also at normal temperature or at moderately elevated temperature by storing the impregnated fibrous material for several hours. When using practically neutral impregnation baths the dyestuffs are advantageously fixed by introducing the impregnated material into an alkali bath containing salt, if necessary after previous intermediate drying and then treating it with heat. A suitable combination of temperature and pH-value allows to fix the dyestuffs also during the dyeing process.

Instead of using the methods of impregnation or direct dyeing in a long bath the dyestuffs can also be applied to the material to be dyed by printing. For this purpose, the dyestuffs are mixed with the usual auxiliaries, for example, urea, dispersing agents, nitrobenzenesulfonic acid sodium, thickening agents, such as methyl cellulose, starch ether, alginate thickenings or emulsion thickenings and an agent having an alkaline effect of the nature indicated above and are printed on the material. The dyestuffs are fixed on the fibrous material, if necessary after previous intermediate drying, by a heat treatment, preferably by steaming or by a developing process in dryness, for example, thermofixation.

It is also possible to apply a printing paste, which contains one or more dyestuffs of the said nature, to the cellulose fabric impregnated with an acid-binding agent and to heat the printed fabric subsequently, for example, by steaming. The cellulose fibrous materials can also be printed first with a printing paste which contains one or more dyestuffs and then treated with the aqueous solution of acid-binding agents, advantageously in the presence of electrolytes, for example sodium chloride or sodium sulfate, at a temperature within the range of from 60° to 100° C.

According to the process of the invention, very valuable, intense dyeings and prints are obtained on fibrous materials containing cellulose, which dyeings and prints are very stable when being subjected to treatments of washing and to the action of light. They have also a remarkable fastness to water, seawater, rubbing, ironing, acids, alkalis and solvents. When being finished afterwards with synthetic resins in an acid medium, the dyeings and prints of the invention show advantageous properties.

The following examples illustrate the invention, the parts and percentages being by weight unless stated otherwise; the parts by weight to the parts by volume are the same as the kilogram to the liter.

EXAMPLE 1

30 parts of the dyestuff of formula

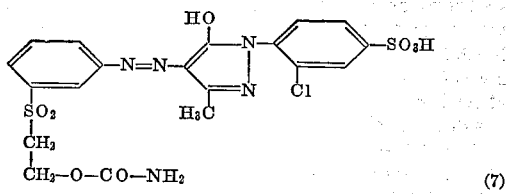

were dissolved with 50 parts of urea in 300 parts by volume of water while heating. After cooling to room temperature and adding 20 parts of sodium bicarbonate the mixture was made up to 1000 parts of a printing paste with a 4% sodium alginate thickening. With this printing paste a fabric of mercerized cotton was printed, dried, steamed at 98–101° C. for 5 minutes and then washed first with cold, then with boiling water and dried. A limpid yellow print with very excellent sharp outlines, good fastness to washing and very good fastness to light was obtained.

The dyestuff of the Formula 7 was prepared as follows:
12.2 parts of the compound of formula

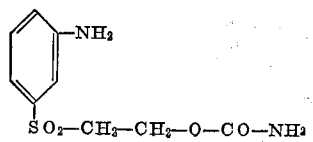

were dissolved while stirring in a mixture of 15 parts of concentrated hydrochloric acid and 150 parts by volume of water, cooled to 0–5° C. and diazotized at that temperature with 10 parts by volume of a 5 N sodium nitrite solution. After having destroyed a small excess of nitrous acid with amidosulfonic acid, the mixture was adjusted at pH 6.5–7.0 by adding 7.5 parts of sodium bicarbonate and coupled with a neutral solution of 15.7 parts of 3-methyl-1-(2'-chloro-4'-sulfophenyl)-pyrazolone-(5) (92%) and 4 parts of sodium carbonate in 100 parts by volume of water. The mixture was stirred at room temperature for 10 hours, the pH was adjusted at 4.5 with a 50% acetic acid and the dyestuff was precipitated by adding 10% (calculated on the volume of the dyestuff solution) of sodium chloride. The dyestuff was suction-filtered and dried at 60° C. in vacuo. After grinding, 29.5 parts of a yellow powder were obtained which was 80% of the dyestuff of Formula 7.

The starting base of Formula 8 could be prepared as follows:

75 parts of chlorosulfonylisocyanate were introduced into 300 parts by volume of ethylene chloride. After adding 115.5 parts of 3-nitro-phenyl-β-hydroxyethyl-sulfone within 5 minutes, the mixture was stirred at 40°–50° C. for 60 minutes. Then, the reaction mixture was placed on 800 parts of ice, the temperature to be maintained being from 0°–10° C. The pH was then adjusted at 6–7 by adding about 90 parts of sodium bicarbonate, the compound which had precipitated was suction-filtered and dried at from 40°–50° C. in vacuo. By catalytic reduction the amino compound of Formula 8 was obtained from that nitro compound, the former having a melting point of from 110–111° C.

EXAMPLE 2

A fabric of mercerized cotton was impregnated with a padding liquor at 20° C., which contained per 1000 parts by volume 15 parts of the dyestuff of formula

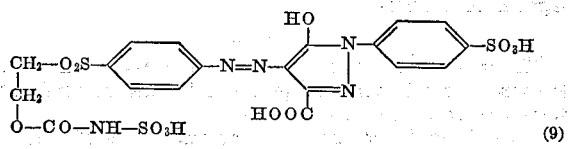

and squeezed to 70% of moisture absorption. After intermediate drying, the fabric was impregnated with a solution which contained 200 parts of sodium chloride and 20 parts by volume of a 33% aqueous sodium hydroxide solution in 1000 parts by volume and squeezed to 90% of moisture absorption. The fabric so treated was steamed at 103°–105° C. for 25 seconds. The dyed material was rinsed with cold water, neutralized with very dilute acetic acid, rinsed with hot water, treated with a boiling 0.1% solution of a detergent on the basis of alkylarylpolyglycol ether, again rinsed with cold water and then dried. A limpid yellow dyeing of good fastness to wet processing, such as washing, water, perspiration and of good fastness to ironing, solvents and rubbing was obtained.

The dyestuff of the Formula 9 could be obtained in the usual manner by diazotizing the compound of formula

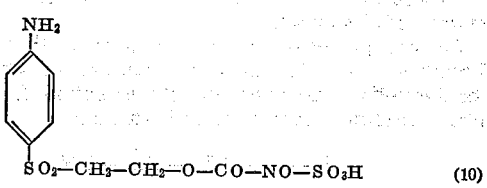

and coupling with 1-(4'-sulfophenyl)-pyrazole-5-on-3-carboxylic acid.

The base of Formula 10 could be prepared as follows: 115.5 parts of 4-nitrophenyl-β-hydroxyethyl-sulfone were reacted with chlorosulfonylisocyanate as described in Example 1 with reference to the 3-nitrophenyl-β-hydroxyethyl-sulfone. The reaction mixture was placed on 800 parts of ice and adjusted at pH 6.5-7.0 with 100.5 parts of sodium bicarbonate. After an hour, the precipitated substance was suction-filtered and dried at 60° C. in vacuo. It melted at 170°-172° C. while being decomposed and was constituted as shown by the formula

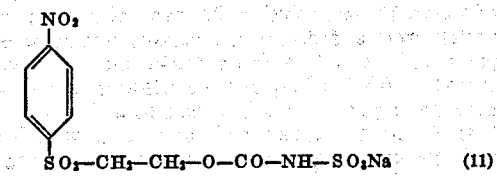

From this compound the base of Formula 10 was obtained by catalytic reduction.

EXAMPLE 3

A linen fabric was impregnated with a dyestuff solution heated to about 10°-15° C. which contained 20 parts of the dyestuff of formula

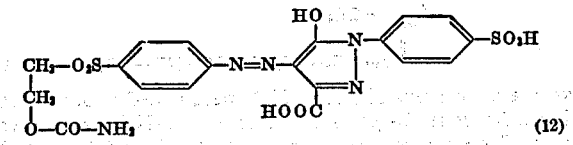

2.5 parts of sodium hydroxide and 9.5 parts of trisodium phosphate in 1000 parts by volume of water and squeezed to a liquor absorption of 80% of the dry weight. The material was rolled up, wrapped in a sheet of polyethylene and stored at room temperature for several hours. Then, the material was rinsed with cold water, neutralized, rinsed first with hot and then with boiling water and dried. A limpid even yellow dyeing was obtained having good general fastness properties.

The dyestuff of Formula 12 to be used could be prepared in the following manner:

When heating the compound of Formula 11 a short while with a 5 N hydrochloric acid to 60-70° C., a solution was formed from which the compound of formula

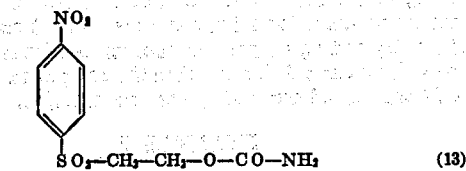

soon precipitated in the form of small white needles which melted after drying at 181°-182° C. By catalytic reduction the base of formula

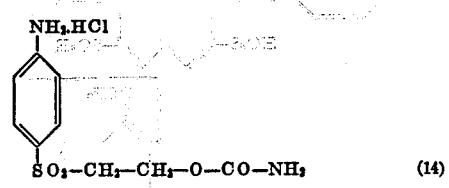

was obtained which melted in the form of its hydrochloric acidic salt at 222°-224° C. under decomposition. 56 parts of the hydrochloric acid salt of the Formula 14 were fed into a mixture of 60 parts of concentrated hydrochloric acid and 1000 parts by volume of water and diazotized at 0°-5° C. with 40 parts by volume of a 5 N sodium nitrite solution. After having destroyed a small excess of nitrous acid with amidosulfonic acid, the pH was adjusted at 6.5-7.0 by adding 60 parts of sodium bicarbonate and the mixture was coupled with a neutral solution of 73 parts of 1-(4'-sulfophenyl)-pyrazole-5-on-3-carboxylic acid (78.6%) and 23 parts of sodium carbonate in 500 parts by volume of water. The mixture was stirred at room temperature for 12 hours, then the pH was adjusted at 5.5 with 2 N acetic acid, and the dyestuff was precipitated by adding potassium chloride. The dyestuff was suction-filtered and dried at 60° C. in vacuo.

EXAMPLE 4

100 parts of a cotton fabric were dyed for 90 minutes in 3000 parts by volume of an aqueous dyeing liquor heated to 60° C., which contained 3 parts of the dyestuff of formula

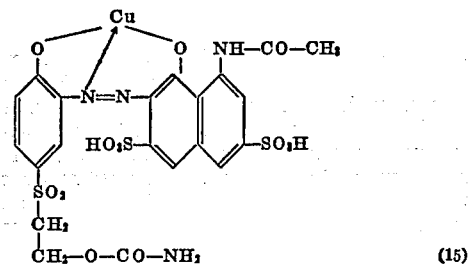

150 parts of sodium sulfate, 15 parts of sodium carbonate and 1 part of sodium hydroxide. The fabric was rinsed with cold water, neutralized with very dilute acetic acid, first rinsed with hot and then with boiling water and dried. A red-violet dyeing of very good fastness to water, sea-water, chlorine bleaching, rubbing, ironing, light and washing was obtained.

The dyestuff of Formula 15 could be obtained as follows: 15 parts of the compound of formula

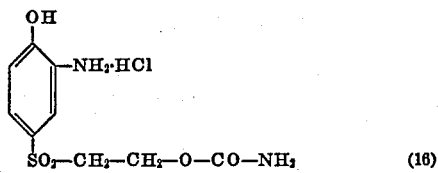

were dissolved in a mixture of 15 parts of concentrated hydrochloric acid and 150 parts by volume of water and diazotized at 0°-5° C. with 10 parts by volume of a 5 N sodium nitrite solution which caused the diazonium salt to precipitate. A small amount of excess nitrous acid was destroyed with a little amidosulfonic acid. Then, the solution was neutralized with 13 parts of sodium bicarbonate. The mixture was coupled with a neutral solution of 35.7 parts of 1-acetyl-amino-8-naphthol-3,6-disulfonic acid (50.5%) and 0.5 part of sodium carbonate in 100 parts by volume of water at room temperature, the pH having been adjusted at 8-8.2 with about 10 parts of sodium bicarbonate. After the reaction had been performed, the mixture was adjusted at pH 4.5-5.0 with 25 parts by volume of a 50% acetic acid. After having added 12.5 parts of crystallized copper sulfate and 12.5 parts of crystallized sodium acetate the mixture was heated at 50°-60° C. for 2 hours. After cooling the dyestuff was precipitated with potassium chloride, suction-filtered and dried in vacuo.

The starting product of Formula 16 could be prepared in the following manner:

150 parts of chlorosulfonylisocyanate were added to 300 parts by volume of ethylene chloride. 123.5 parts of 2-nitrophenol-4-β-oxyethylsulfone were added while stirring, the temperature being raised at about 56° C. After a while, a solid body precipitated. The reaction mixture was placed on 800 parts of ice and adjusted at pH 6.5–7.0 with about 235 parts of sodium bicarbonate. The ethylene chloride was separated from the aqueous phase from which a crystalline body was precipitated by adding potassium chloride; the body was suction-filtered and dried in vacuo. It was heated at 80° C. for some minutes in the 5-fold amount of 5 N hydrochloric acid which treatment led to the precipitation of the compound of formula

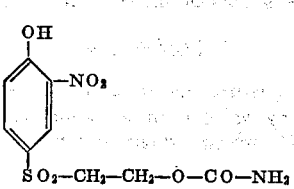
(17)

which melted at 173°–174° C. when dry. 58 parts of this compound were catalytically reduced in 300 parts by volume of methanol by adding 10 parts of a nickel catalyst at 40° C. The solution which had been separated from the catalyst was evaporated until dry. The residue was treated with 19.6 parts of concentrated hydrochloric acid, whereafter the chlorohydrate of Formula 16 crystallized and melted at 218°–220° C. under decomposition after recrystallization from 80% ethanol.

EXAMPLE 5

30 parts of the dyestuff of formula

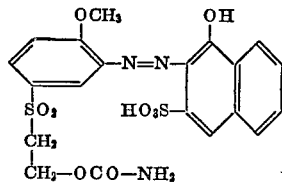
(18)

were dissolved in 1000 parts by volume of water. Then, 6 parts of sodium hydroxide and 30 parts of sodium sulfate were added at 20° C. With this solution a cotton fabric was impregnated and squeezed to a liquor absorption of 80%, calculated on the dry weight. The material so treated was rolled up, wrapped in a sheet of polyethylene and stored for several hours at room temperature. Then, the material was rinsed with cold water, neutralized, then rinsed first with hot and then with boiling water and finally dried. An even, limped scarlet dyeing of remarkable all-around fastness properties was obtained.

The dyestuff of Formula 18 could be prepared by diazotizing the compound of formula

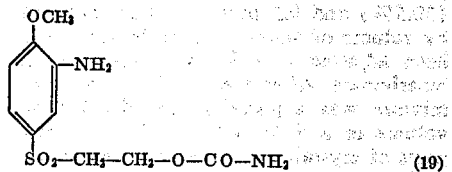
(19)

and coupling with 1-naphthol-3,6-disulfonic acid.

The compound of Formula 19 which melted at 141°–142° C. could be obtained in the same manner as the base of the Formula 8 described in Example 1 when using as starting product (3-nitro-4-methoxy-phenyl)-(β-hydroxyethyl)-sulfone.

EXAMPLE 6

2.5 parts of the dyestuff of formula

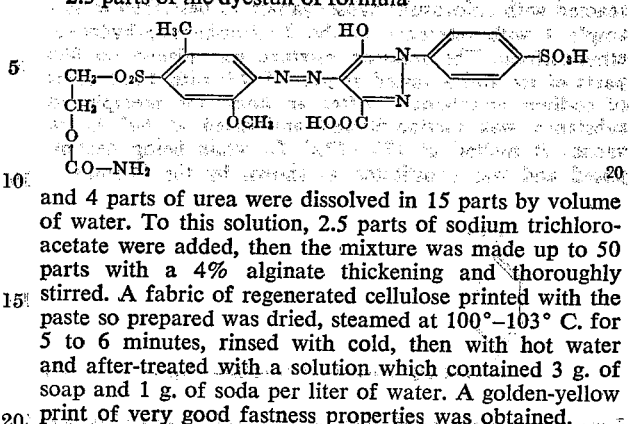
(20)

and 4 parts of urea were dissolved in 15 parts by volume of water. To this solution, 2.5 parts of sodium trichloroacetate were added, then the mixture was made up to 50 parts with a 4% alginate thickening and thoroughly stirred. A fabric of regenerated cellulose printed with the paste so prepared was dried, steamed at 100°–103° C. for 5 to 6 minutes, rinsed with cold, then with hot water and after-treated with a solution which contained 3 g. of soap and 1 g. of soda per liter of water. A golden-yellow print of very good fastness properties was obtained.

The dyestuff of the formula was obtained in the following manner:

9.6 parts of the compound of formula

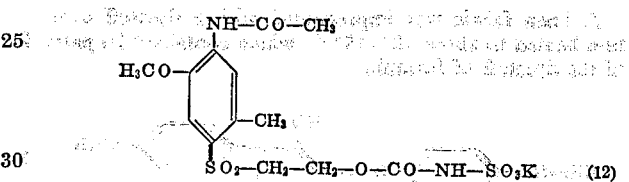
(12)

with a net content of salt of 93% were boiled under reflux for 2 hours in 50 parts by volume of 2 N hydrochloric acid. The mixture was cooled to 0°–5° C. and diazotized with 20 parts by volume of 1 N sodium nitrite solution. The amount of excess nitrous acid was destroyed with amido-sulfonic acid and the pH was adjusted at 6–6.5 with 10 parts of sodium bicabonate. Coupling was effected with a neutral solution of 7.3 parts of 1-(4'-sulfophenyl)-pyrazole-5-on-3-carboxylic acid (78.6%) and 2.3 parts of sodium carbonate in 50 parts by volume of water, the mixture was stirred at room temperature for 17 hours, salted out with potassium chloride, suction-filtered and dried. The starting compound of Formula 21 was obtained in the following manner:

57.4 parts of (5 - acetamino - 4 - methoxy-1-methylphenyl)-2-β-hydroxy-ethyl-sulfone were introduced into a mixture of 120 parts by volume of ethylene chloride and 30 parts of chlorosulfonyl isocyanate, the temperature having been raised to 45° C. The mixture was stirred at that temperature for 1 hour and then placed on 320 parts of ice. By adding 44 parts of sodium bicarbonate, the pH was adjusted at 6.5–7.0 and then the compound of Formula 21 was salted out with potassium chloride.

EXAMPLE 7

2 parts of the dyestuff of formula

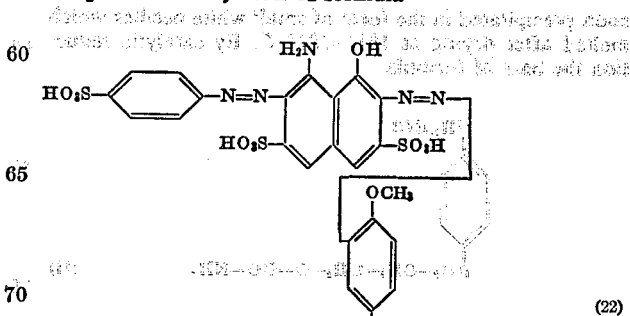
(22)

were dissolved with 4 parts of urea in 15 parts by volume of water. 1 part of sodium bicarbonate and 25 parts of emulsion thickening were added and the mixture was stirred. It was made up to 50 parts with water and emulsion thickening. (The emulsion thickening was prepared by mixing 450 parts of an aqueous 4% alginate thickening, 10 parts of a condensation product of polyethylene glycol and fatty acid, 240 parts by volume of water and 300 parts of heavy gasoline.)

A cotton fabric was printed with this printing paste and finished in the same manner as described in Example 1. A navy-blue print of very good general fastness properties was obtained.

The dyestuff of Formula 22 was prepared by diazotizing aniline-4-sulfonic acid and acid coupling with 1-amino-8-naphthol-3,6-disulfonic acid and subsequent coupling of the monoazo dyestuff so obtained in slightly alkaline phase with the diazotized compound of Formula 19.

EXAMPLE 8

In a dyeing liquor which contained in 3000 parts by volume of water of 40° C. 6 parts of trisodium phosphate and 1 part of dyestuff of the formula

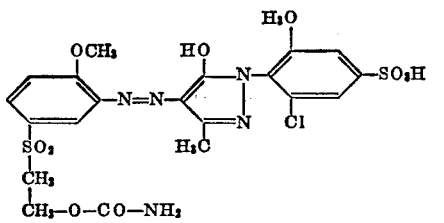
(23)

100 parts of a polyamide fabric were introduced and treated for 10 minutes. 12 parts by volume of acetic acid of 30% were added and heated to boiling within about 45 minutes. The material was dyed at the boiling temperature for 60 minutes and washed first with cold, then with hot water and dried. An even, limpid, yellow dyeing was obtained which had very good fastness to light and wet processing. Similar dyeings were obtained when working at a temperature within the range of from 70° C. to 100° C. or under high temperature conditions between 101° C. to 130° C.

The dyestuff of Formula 23 was obtained by diazotizing the compound of Formula 19 and coupling with 1-(2'-chloro - 6' - methyl-4'-sulfophenyl)-3-methyl-pyrazolone-(5).

EXAMPLE 9

2 parts of dyestuff of the formula

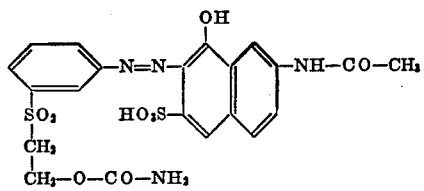
(24)

were dissolved in 40 parts by volume of boiling water. The solution was cooled to 80° C., 2 parts of trisodium phosphate were added at that temperature and the mixture was stirred. After 5 minutes, this dyestuff solution was added to a dyebath of 40° C. which consisted of 4000 parts by volume of water, 10 parts of sodium sulfate, 7 parts by volume of a 30% acetic acid and which contained 100 parts of wool yarn. The material was dyed for 1 hour at boiling temperature and at pH 5, the dyeing liquor was removed and a novel liquor which consisted of 4000 parts by volume of water and 8 parts of disodium phosphate, was fed in and used for treating the material to be dyed at 80° C. and pH 8 for 20 minutes. The material was rinsed as usual and dried. A red-orange dyeing of very good general fastness properties was obtained.

Instead of after-treating with a novel liquor which contained disodium phosphate, the original dyeing liquor could be adjusted at pH 8 with ammonia water and be allowed to stand a while at elevated temperature.

The dyestuff of the formula was obtained by diazotizing the compound of the Formula 8 indicated in Example 1 and coupling with 7-acetamino-1-naphthol-3-sulfonic acid.

EXAMPLE 10

When replacing in Example 1 the dyestuff of Formula 7 by the same amount by weight of the dyestuff of formula

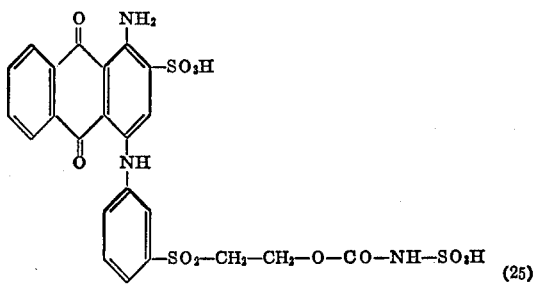
(25)

a brilliant blue print of excellent fastness to light and very good fastness to wet processing was obtained. The dyestuff of the Formula 25 could be prepared as follows:

25 parts of the anthraquinone dyestuff of formula

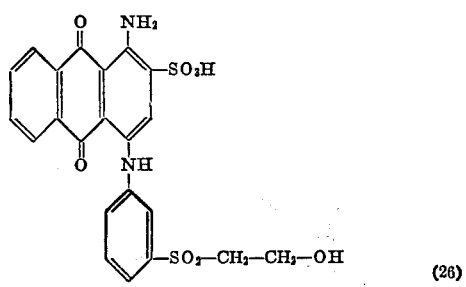
(26)

were introduced into 50 parts by volume of pyridine. At 10° to 25° C. 22 parts of the addition compound of chlorosulfonyl isocyanate and pyridine were added. The mixture was stirred at 30° C. for 18 hours. Then, the reaction mixture was poured into cold water. The dyestuff was then precipitated with potassium chloride, suction-filtered, washed with potassium chloride solution and finally dried.

EXAMPLE 11

A cotton fabric was impregnated with a solution of 20 parts of a 33% sodium hydroxide solution in 1000 parts by volume of water, squeezed and dried. A printing paste of the following composition was printed on this material:

| | Parts |
|---|---|
| Dyestuff of Formula 23 | 20 |
| Urea | 50 |
| 4% alginate thickening | 500 |
| Water | 430 |

After drying the material was steamed at 101° to 103° C. for 5 minutes and finished in the usual manner by rinsing and soaping. A limpid yellow print of very good general fastness properties was obtained.

The following table contains a series of further dyestuffs which can be used in accordance with the invention as well as the shades of the dyeings and prints so obtained on cotton.

| Number | Composition of the dyestuff | Shade |
|---|---|---|
| 1 | 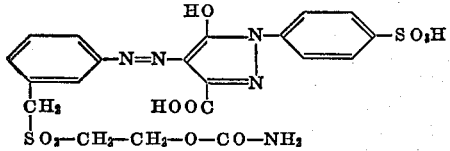 | Limpid yellow. |
| 2 | 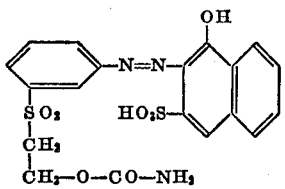 | Orange. |
| 3 | 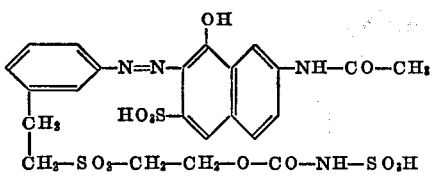 | Do. |
| 4 | 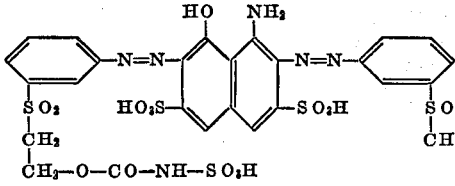 | Blue black. |
| 5 | 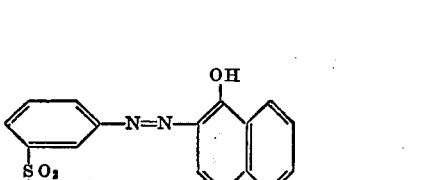 | Red. |
| 6 | 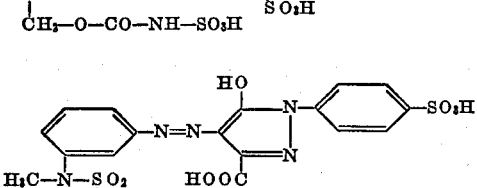 | Yellow. |
| 7 | 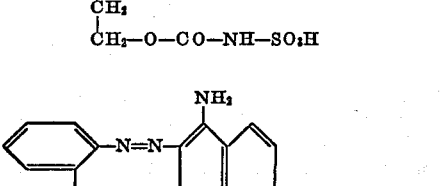 | Orange. |
| 8 | 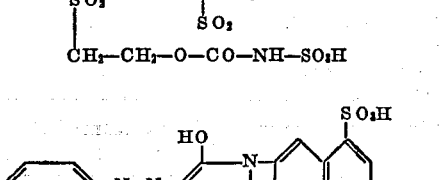 | Yellow. |

TABLE—Continued
| Number | Composition of the dyestuff | Shade |
|---|---|---|
| 9 | 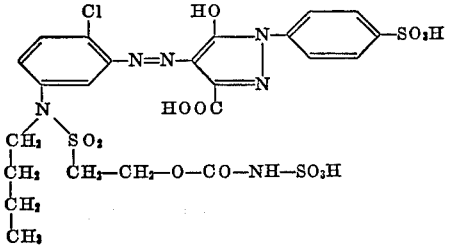 | Yellow. |
| 10 | 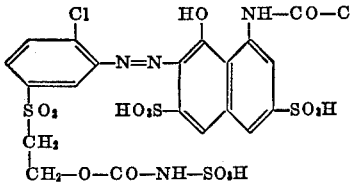 | Red. |
| 11 | 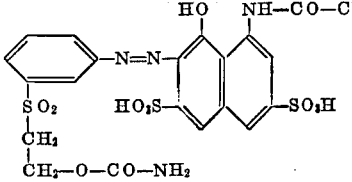 | Red. |
| 12 | 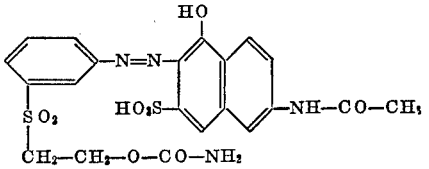 | Yellowish orange. |
| 13 | 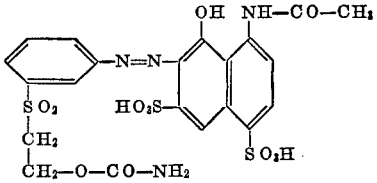 | Red. |
| 14 | 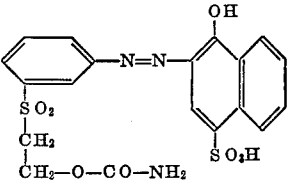 | Orange. |
| 15 | 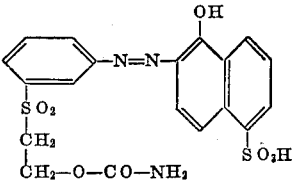 | Yellowish red. |
| 16 | 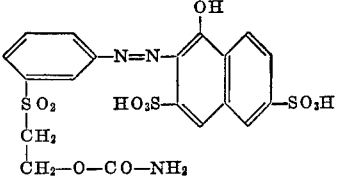 | Orange. |
| 17 | 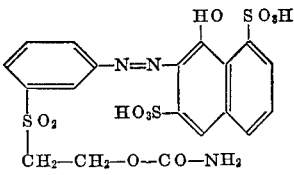 | Do. |

TABLE—Continued

| Number | Composition of the dyestuff | Shade |
|---|---|---|
| 18 | (structure) | Orange. |
| 19 | (structure) | Covered Navy blue. |
| 20 | (structure) | Blue-black. |
| 21 | (structure) | Covered blue. |
| 22 | (structure) | Do. |
| 23 | (structure) | Reddish orange. |
| 24 | (structure) | Red. |
| 25 | (structure) | Red. |

TABLE—Continued
| Number | Composition of the dyestuff | Shade |
|---|---|---|
| 26 | 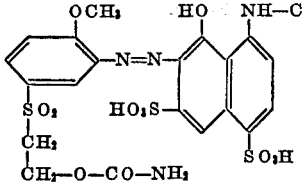 | Red. |
| 27 | 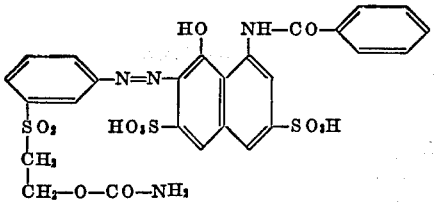 | Red. |
| 28 | 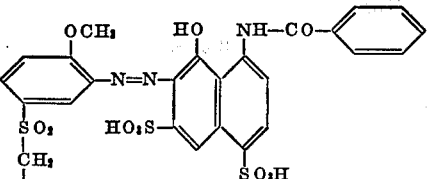 | Red. |
| 29 | 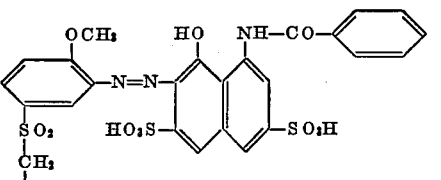 | Bluish red. |
| 30 | 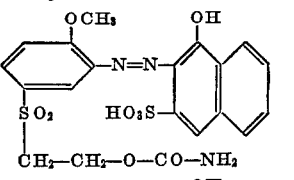 | Orange. |
| 31 | 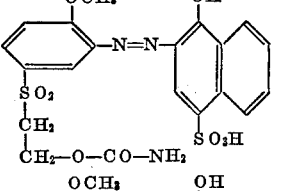 | Scarlet. |
| 32 | 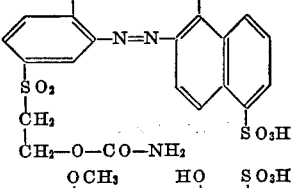 | Red |
| 33 | 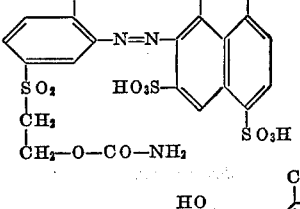 | Orange. |
| 34 | 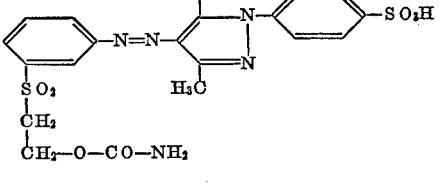 | Yellow. |

TABLE—Continued

| Number | Composition of the dyestuff | Shade |
|---|---|---|
| 35 | (structure) | Yellow. |
| 36 | (structure) | Blue black. |
| 37 | (structure) | Scarlet. |
| 38 | (structure) | Yellow. |
| 39 | (structure) | Do. |
| 40 | (structure) | Do. |
| 41 | (structure) | Yellow brown. |
| 42 | (structure) | Covered red. |

TABLE—Continued

| Number | Composition of dyestuff | Shade |
|---|---|---|
| 43 | (structure) | Bluish red. |
| 44 | (structure) | Covered blue. |
| 45 | (structure) | Bluish red. |
| 46 | (structure) | Orange. |
| 47 | (structure) | Greenish yellow. |
| 48 | (structure) | Yellow. |
| 49 | (structure) | Reddish yellow. |
| 50 | (structure) | Covered reddish yellow. |

| Number | Composition of dyestuff | Shade |
|---|---|---|
| 51 | (Cu complex structure: phenyl–SO₂–CH₂–CH₂–O–CO–NH₂ group, azo linkage, pyrazolone with CH₃, coupled to phenyl-SO₃H) | Covered reddish yellow. |
| 52 | H₂N–CO–O–CH₂–CH₂–O₂S–C₆H₄–N=N–(2-hydroxynaphthalene-3,6-disulfonic acid; HO₃S, SO₃H) | Orange. |
| 53 | H₂N–CO–O–CH₂–CH₂–O₂S–C₆H₄–N=N–(1-hydroxy-8-benzoylamino-naphthalene-3,6-disulfonic acid) | Red. |
| 54 | (3-sulfo-CH₂–CH₂–O–CO–NH₂)-phenyl–NH–CO–C₆H₄–N=N–(1-hydroxy-8-acetylamino-naphthalene-3,6-disulfonic acid) | Red. |
| 55 | (Cu complex: 2-hydroxy-5-(β-carbamoyloxyethylsulfonyl)phenyl–N=N–2-hydroxynaphthalene-4-sulfonic acid) | Covered red. |
| 56 | (Cu complex of 4-(β-carbamoyloxyethylsulfonyl)-2-hydroxyphenyl–N=N–(1-hydroxy-6-sulfo-naphth-2-yl)–N=N–(1-hydroxy-2-amino-naphthalene-3,6-disulfonic acid)) | Blue. |
| 57 | [Cr complex, 1:2, bis-azo ligand: 4-(β-carbamoyloxyethylsulfonyl)-2-oxyphenyl–N=N–(1-oxy-6,8-disulfo-naphth-2-yl with NH–CO–CH₃)]·5Na⁺, 5(−) | Navy blue. |

TABLE—Continued
| Number | Composition of dyestuff | Shade |
|---|---|---|
| 58 | 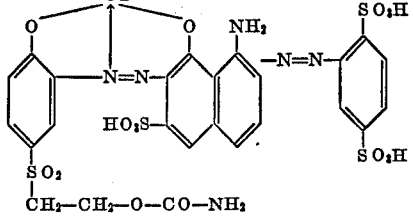 | Greenish navy blue. |
| 59 | | Brown. |
| 60 | | Grey. |
| 61 | | Bluish black. |
| 62 | | Fluorescent greenish yellow. |

TABLE—Continued
| Number | Composition of dyestuff | Shade |
|---|---|---|
| 63 | 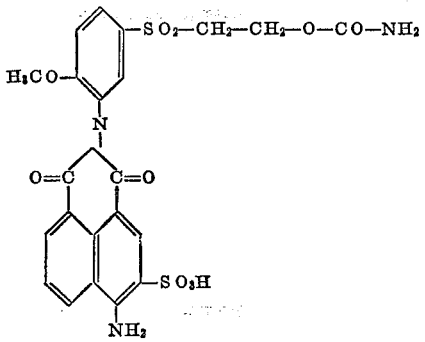 | Fluorescent greenish yellow. |
| 64 | 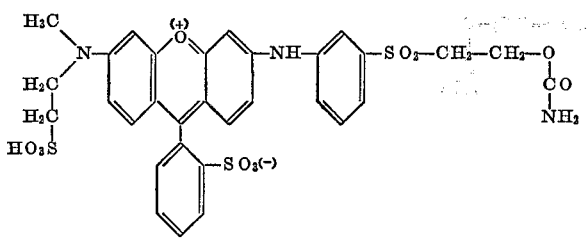 | |
| 65 | 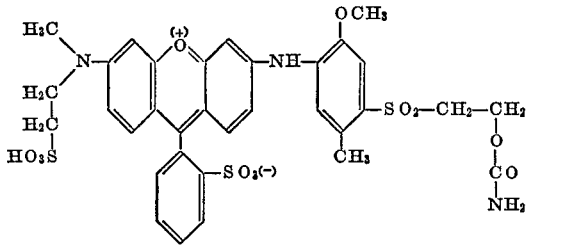 | Brilliant reddish violet. |
| 66 | 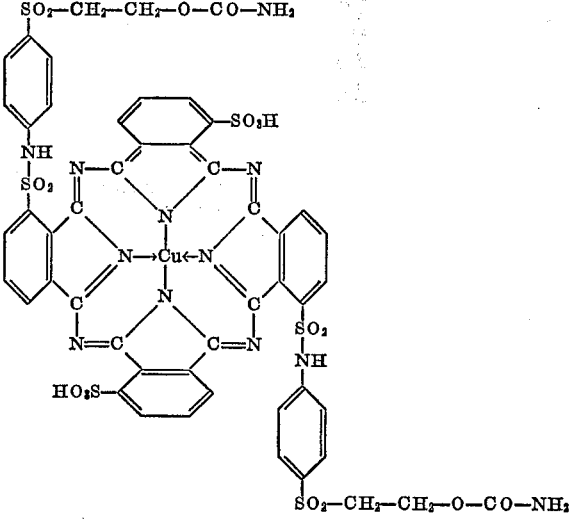 | Turquoise blue. |

TABLE—Continued

| Number | Composition of dyestuff | Shade |
|---|---|---|
| 67 | (structure with Ni complex bearing four SO₂–CH₂–CH₂–O–CO–NH₂ and SO₃H/HO₃S groups) | Bluish green. |
| 68 | (anthraquinone structure with NH₂, SO₃H, HO₃S, NH-aryl-OCH₃, O₂S–CH₂–CH₂–O–CO–NH₂) | Blue. |
| 69 | (Cu azo complex with SO₃ and SO₂–CH₂–CH₂–O–CO–NH₂, 2(−) 2K(+)) | Greenish blue. |
| 70 | (Cu azo complex with SO₃, NO₂, and SO₂–CH₂–CH₂–O–CO–NH₂, 2(−) 2K(+)) | Green. |

TABLE—Continued

| Number | Composition of dyestuff | Shade |
|---|---|---|
| 71 | 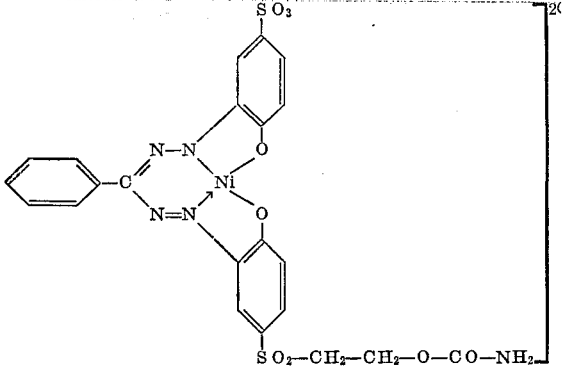 | Violet brown. |
| 72 | 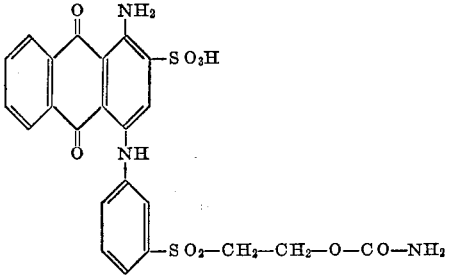 | Brilliant blue. |

We claim:

1. A process for the preparation of a fast dyeing or print on a fibrous material having a hydroxyl group or a nitrogen atom which comprises applying to said fibrous material a water-soluble organic dyestuff having at least one group of the formula $$-SO_2-CH_2-CH_2-O-CO-NH-X$$

wherein X is hydrogen or an —$SO_3H$— group, and fixing said dyestuff on said fibrous material.

2. A process according to claim 1 wherein said dyestuff is fixed at normal temperature or at elevated temperature.

3. A process according to claim 2 wherein said dyestuff is fixed by applying heat to said material.

4. A process according to claim 1 wherein said dyestuff is applied in the presence of an alkaline agent or an agent having an alkaline effect.

5. A process according to claim 4 wherein said agent is applied with said dyestuff, is applied to said fibrous material prior to application of said dyestuff, or is applied to said fibrous material after application of said dyestuff.

6. A process according to claim 4 wherein said agent is an alkaline earth metal hydroxide or an alkali earth metal hydroxide, bicarbonate, carbonate, phosphate, borate, silicate or trichloroacetate, or a mixture thereof.

7. A process according to claim 1 wherein said oragnic dyestuff is of the monoazo, disazo, triazo, tetrakisazo, polyazo, anthraquinone, phthalocyanine, fromazane, nitro, dioxazine, sulfoflavine or rhodamine series, or a heavy metal complex compound of said azo or formazane series.

8. A process according to claim 1 wherein said fibrous material is wool or a synthetic polyamide.

9. A process according to claim 1 wherein said fibrous material is native or regenerated cellulose.

References Cited

UNITED STATES PATENTS 3,440,240  4/1969  Kuhne et al. _____ 8—163 X
3,632,611  1/1972  Kenmochi et al. _____ 8—163 X LEON D. ROSDOL, Primary Examiner T. J. HERBERT, Jr., Assistant Examiner U.S. Cl. X.R.

8—54, 54.2, 163